United States Patent [19]

Kay

[11] 4,302,262

[45] Nov. 24, 1981

[54] WEATHER SEALING STRIPS FOR DOORS AND WINDOWS

[76] Inventor: Francis X. Kay, The School House, Addington, Buckinghamshire, England

[21] Appl. No.: 22,614

[22] Filed: Mar. 20, 1979

[30] Foreign Application Priority Data

Mar. 20, 1978 [GB] United Kingdom ............... 10998/78

[51] Int. Cl.³ ........................... B32B 3/06; C09J 7/02; E06B 7/16; E06B 7/23
[52] U.S. Cl. ........................................ 156/71; 49/475; 49/485; 49/486; 49/495; 49/496; 427/208; 427/208.4; 427/208.6; 428/40; 428/41; 428/156; 428/189; 428/192; 428/332; 428/337; 428/343; 428/354; 156/202; 98/95; 98/119; 251/120; 251/368
[58] Field of Search ................... 428/40, 41, 189, 343, 428/332, 156, 192, 337, 354; 49/475, 485, 486, 495, 496; 156/292; 427/208, 208.4, 208.6

[56] References Cited

U.S. PATENT DOCUMENTS

| | | | |
|---|---|---|---|
| 1,895,040 | 1/1933 | Korbial | 428/189 |
| 2,249,424 | 7/1941 | Hanington | 428/189 |
| 2,964,438 | 12/1960 | Mosse | 428/189 |
| 3,032,181 | 5/1962 | Hutter et al. | 428/189 |
| 3,380,582 | 4/1968 | Moyer | 428/189 |
| 3,581,884 | 6/1971 | Caldwell | 428/40 |
| 4,082,875 | 4/1978 | Citron | 428/189 |
| 4,126,966 | 11/1978 | Lobell | 428/189 |

FOREIGN PATENT DOCUMENTS

217821  3/1957  Australia ............................... 49/496

OTHER PUBLICATIONS

Smay, Popular Science, Nov. 1978, p. 96.

*Primary Examiner*—James C. Cannon
*Attorney, Agent, or Firm*—Kurt Kelman

[57] ABSTRACT

A sealing strip for preventing or reducing gas flow in an unwanted direction through an elongate gap, such as the gap between a door or window and its associated frame, and comprising a lip portion extending along the length of the strip and an attachment portion extending along the length of the strip for securing the strip in position adjacent to one side of such a gap, is characterized by said lip portion being flexible and capable of being deformed into sealing engagement with the opposite side of the gap, at least partly to seal the gap, by gas flow into the gap in the unwanted direction. A method of preventing or reducing gas flow in an unwanted direction through such a gap by using such a strip is also disclosed.

33 Claims, 11 Drawing Figures

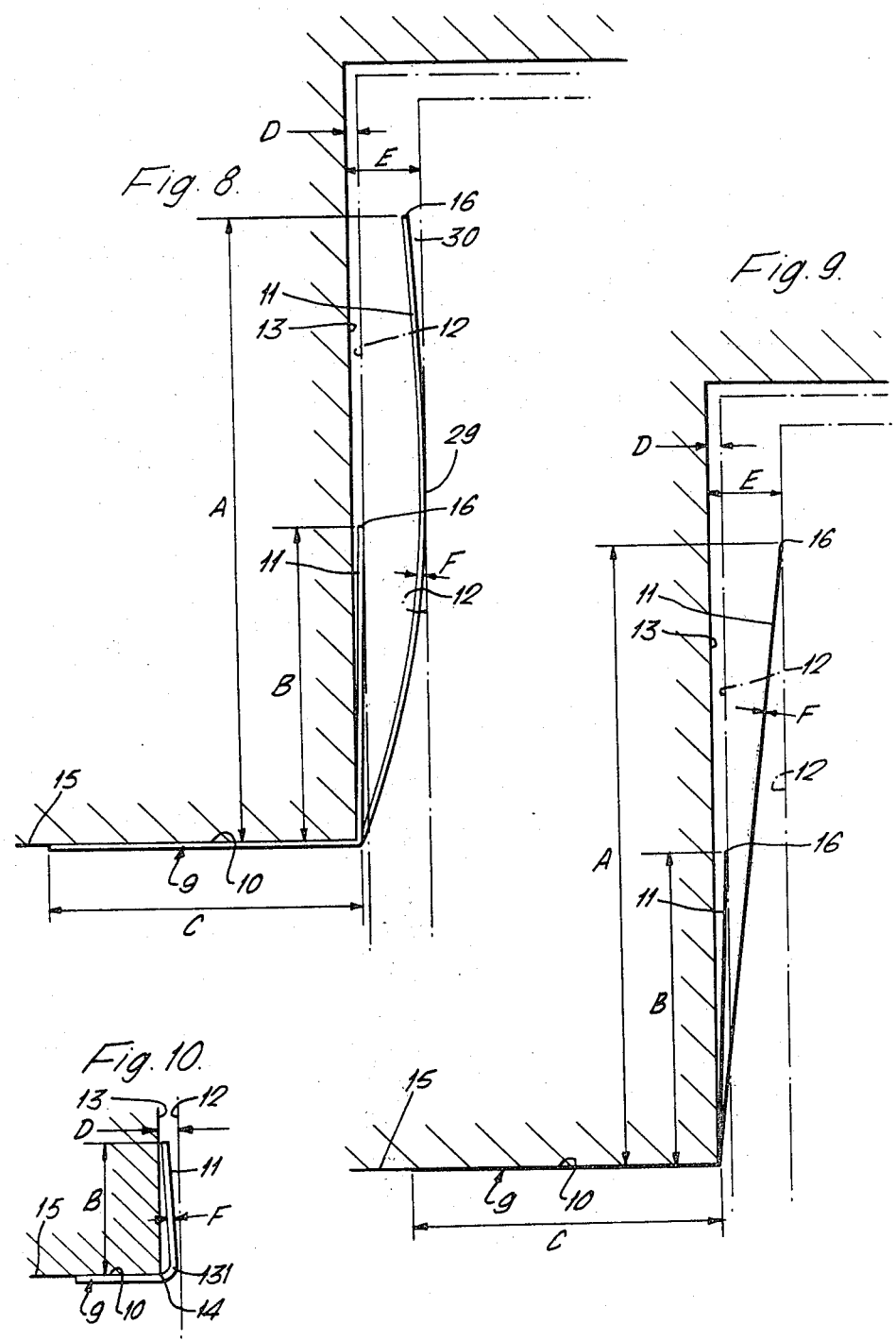

WEATHER SEALING STRIPS FOR DOORS AND WINDOWS

BACKGROUND OF THE INVENTION

This invention relates to sealing strips and concerns a sealing strip for preventing or reducing gas flow in an unwanted direction through an elongate gap, such as a gap between a door or window and its associated frame, and also concerns a method of preventing or reducing gas flow in an unwanted direction through an elongate gap.

Windows and doors are a notorious source of heat loss in houses and other buildings. There are two main ways by which such heat loss occurs: there is direct heat loss caused by conduction through the structural material of the window or door; and there is heat loss caused by the flow into the building of cold draughts that pass through any gaps between a door or window and its associated frame.

Heat losses caused by draughts are almost inevitable because it is very difficult as a practical matter to provide doors and windows that are a perfect sealing fit in their frames. Further, in the case of sash windows it is generally necessary to provide a clearance gap between the window sash and frame in order that the window can be slid open and closed.

As an illustration of the possible magnitude of heat losses resulting from such a clearance gap, consider a single element of a sash window measuring 38 in $\times$ 34 in (0.97 m $\times$ 0.86 m). A clearance between the sash and window frame of 0.015 in (0.38 mm) provides a total draught area of 2.16 in$^2$ (13.9 cm$^2$), that is approximately equivalent to the area of a circular hole 1.66 in (42 mm) in diameter.

Such a gap is thus capable of allowing a draught flow therethrough of approximately 2 ft$^3$ (0.057 m$^3$) per minute, at a notional pressure differential of 0.5 lb/in$^2$ (3.4 $\times$ 10$^3$ N/m$^2$).

In an attempt to diminish heat losses caused by draughts, various expedients have been adopted to improve the fit between doors or windows and their frames and reduce the area of gaps therebetween.

For example, it is well known to secure strips of crushable material, such as foam plastic, to an appropriate surface of a door, window or frame. Such a strip may be fitted during construction of a door or window, for example by being embedded in the frame of a sash window. Alternatively, such a strip may be fitted to existing windows or doors, usually by means of adhesive. The use of such strips has various disadvantages. For example, they hinder the free sliding of sash windows. Further, such a strip can only be used in circumstances in which there is a sufficiently large gap between the door or window and frame to accommodate the strip and sometimes, particularly with casement windows, a sufficiently large gap is not available.

It is also well known to attempt to improve the sealing of doors and windows by the use of strips of relatively rigid, resilient material, including metals such as bronze, and suitable plastics materials. One edge of such a strip is secured, for example by means of tacks or pins, to an appropriate surface of a door, window or frame, the strip being provided with a raised free edge that extends towards an associated surface of a door etc. for engagement and depression thereby when the door or window is closed. Such strips are found to be fairly effective in reducing draughts, but do not form a perfect seal, partly because of the necessary rigidity of the strip material and its consequent inability to conform exactly with the surface it engages. Further, in some cases the use of such strips hinders the opening and closing of doors and windows.

SUMMARY OF THE INVENTION

According to one aspect of the present invention there is provided a sealing strip comprising a flexible sealing lip portion extending along the length of the strip and an attachment portion extending along the length of the strip for securing the strip in position adjacent to one side of an elongate gap to be sealed, said lip portion being capable of being deformed in response to gas flow in an unwanted direction into the gap.

As noted, the lip portion of a strip in accordance with the invention is capable of being deformed by the flow of gas in an unwanted direction into a gap to be sealed. Thus, when an appropriate such strip is secured in position, by means of the attachment portion thereof, adjacent to one side of a gap to be sealed with the sealing lip portion of the strip extending into the gap, gas flow into the gap in an unwanted direction deforms the lip portion, causing the lip portion to be brought into, or retained in, engagement with the opposite side of the gap, thus at least partly sealing the gap and preventing or reducing the flow of gas therethrough.

A strip in accordance with the invention may thus conveniently be used as a draught seal for sealing gaps between doors or windows and their frames and preventing or reducing flow of draughts into a building from outside, an appropriate strip being secured in position adjacent to one side of a gap between a door or window and its frame with the sealing lip portion of the strip extending into the gap. Several different configurations of use of a strip are possible in such an application, the most appropriate arrangement for a particular case depending upon factors such as the details of construction of the door or window under consideration and the area and configuration of available surfaces adjacent the gap to be sealed.

For example, a sash window is conveniently treated with strip in accordance with the invention by sliding the sealing lip portion thereof into the gap between the sash inner face and the frame inner beading, bending the strip around the beading edge and securing the attachment portion of the strip to the adjacent face of the inner beading. The strip is thus disposed in a bent configuration, being bent around the beading edge, with the sealing lip portion of the strip disposed at approximately 90° to the attachment portion thereof. Such bending results in restoring stresses being set up in the strip material that cause the outer, free edge of the sealing lip portion to tend to be raised from the beading surface and biased towards and brought into contact with the sash inner face. Any draughts flowing from outside into the gap between the sash and inner beading will thus encounter the strip sealing lip portion extending across the gap and deform this portion further, tending to force the free edge thereof into sealing engagement with the sash inner face and thus sealing the gap.

Sealing strip can be fitted in this manner around the four sides of a sash window to be treated, resulting in a complete seal around the window. A window thus treated can be opened and closed almost as easily as before treatment: the strips at the sides of the window will flex slidingly, and those at the top and bottom of the window can be released upon opening and folded over again on closure.

Alternatively, a sash window may be treated by securing the attachment portion of a strip to an appropriate surface of the sash, inner bead or outer bead or within the running channel between the beads, the strip being so positioned that the sealing lip portion is disposed upstream of the attachment portion and said portions lie in approximately the same plane. With such an arrangement, draughts flowing from outside into the gap between the sash and frame will tend to pass beneath and lift the free edge of the sealing lip portion, urging the free edge into contact with the opposing surface of the frame or sash and forming a seal therewith.

To assist such lifting action, especially in the case of strips for use in wide gaps, the strip is preferably so constructed that when secured to a flat surface there is a tendency for the free edge of the sealing up portion to be raised from the surface, with the sealing lip portion inclined up to as much as about 30° with respect to the surface. Such an inclination may be imparted to a strip, when fitted, by a variety of methods. For example, one convenient method comprises providing a raised strip or deformation ridge running along the length of the strip between the attachment portion and sealing lip portion such that when the attachment portion is secured to a flat surface, the raised strip or deformation ridge contacts the surface causing the sealing lip portion to pivot about the line of the raised strip or deformation ridge and become raised from the surface.

Doors and casement windows are conveniently treated with strip in accordance with the invention by a method analogous to the latter, alternative method described above in connection with sash windows. In this application, strip is secured to an appropriate surface of a door, window or frame, for example to the inner face of a window casement or to a door frame, such that the strip is disposed in an approximately flat or slightly inclined configuration in a gap between the door or window and its frame, with the sealing lip portion of the strip disposed upstream of the attachment portion.

As noted above, the attachment portion of a strip in accordance with the invention is for securing the strip in position adjacent to one side of a gap to be sealed. Clearly, the method of attachment of the strip and hence the nature of the attachment portion thereof can be varied depending on the proposed use of the strip. For example, if the strip is intended for attachment to wood or other similar materials, for example a wooden door, window or frame, attachment to such materials can be effected by means of pins or tacks, suitably spaced guide holes conveniently being provided in the strip attachment portion.

Preferably, however, attachment is effected by means of adhesive. A surface of the attachment portion of sealing strip of the invention is thus desirably provided with an adhesive material forming one or more adhesive regions on the attachment portion surface. The adhesive region is preferably in the form of an adhesive stripe extending inwardly from one edge of the strip in a continuous line along the length of the strip. A removable cover strip of protective material is conveniently provided over such an adhesive region or regions, arranged for easy removal prior to use of the strip.

The nature and properties of the adhesive material may be selected having regard to the proposed use of the strip. Preferably, the adhesive should be one that seals on contact with the intended surface, for example a wooden or metal door, window or frame; adheres securely to the surface; does not damage surface finishes, such as paint, varnish or plaster; and can be readily removed without damaging the surface. In addition, the adhesive is preferably also reusable, making the strip itself reusable. Rubber based adhesives have been found to have satisfactory adhesive properties in most circumstances. It is, however, preferred to use ultra violet resistant synthetic adhesives because such adhesives undergo negligible deterioration and remain clear and heat resistant over very long periods of time.

Further, the width of the adhesive portion, for example an adhesive stripe, can be varied having regard to factors such as the strength of the adhesive, the dimensions and material of the sealing lip portion, the width of the gap to be sealed, and the nature of the surface to which adhesion is required. It is found that for most applications in sealing doors and windows an adhesive stripe width in the range 0.25 in to 1in (6.35 mm to 25.4 mm) is appropriate.

A strip in accordance with the invention and having an adhesive stripe, as discussed above, may conveniently be produced using a strip of commercially available adhesive tape, for example that sold as Scotch tape or Sellotape ("Scotch" and "Sellotape" are Registered Trade Marks). In order to produce strip in accordance with the invention, a strip of adhesive tape, that may be adhesive on one or both sides, has adhered to one side thereof a strip of lip material arranged to form, at least in part, the sealing lip portion of the strip. Remaining uncovered adhesive regions of the tape may be masked, as appropriate, with suitable masking material, such as further lip material, tape or other material, an adhesive stripe of desired width being left uncovered on one side of the tape, or being provided with a removable cover, to enable attachment of the strip in position adjacent to one side of a gap to be sealed.

It is clear that many different configurations of tape, lip material and masking material are possible. For example, single sided adhesive tape of width in the range ¼ in to 1¼ in (6.35 mm to 31.75 mm) say, may have adhered along its length a strip of lip material extending inwardly from one edge of the tape and possibly also outwardly therefrom, leaving uncovered an adhesive stripe extending along the opposing edge of the tape. The lip material may thus have a width equal to or wider than the width of adhesive tape to be covered thereby. That is to say, the lip material may exactly cover a stripe of adhesive material extending inwardly from one edge of the tape, the lip portion of the resulting strip thus consisting of a layer of tape covered by a layer of lip material. Alternatively, the lip material may be wider than the adhesive stripe covered thereby and may extend beyond said one edge of the tape, the lip portion of the resulting strip thus consisting of an inner portion composed of a layer of tape covered by a layer of lip material and an outer portion composed of lip material only.

Double-sided, adhesive tape may be treated in a similar manner, with a one or more part mask covering the opposing side of the tape. Alternatively, one side of such tape may be left completely uncovered, constituting the adhesive stripe, the other side being covered, at least in part, with a strip of lip material that extends outwardly from one edge of the tape and constitutes the sealing lip portion of the resulting strip. Suitable masking material is provided if necessary to cover any adhesive on the other side of the tape that is not covered by the lip material.

As a further possibility, tape having an adhesive stripe extending along its length adjacent to one edge and a non-adhesive strips adjacent to the opposing edge could be manufactured specially.

In another possible arrangement of strip embodying the invention, the adhesive stripe is provided with a cover strip of protective material that is longitudinally divided into two separately removable portions: a relatively wide, outer, edge portion, and a relatively narrow, inner, central portion. The sealing strip is so constructed that if only the outer cover portion is removed, the inner cover part forms a raised central strip that causes inclination of the sealing lip portion of the strip when the strip is secured to a flat surface, as discussed above. However, if both cover portions are removed, the resulting strip is substantially planar. The same strip is thus adapted for use in both of the main window and door sealing treatment methods discussed above.

Considering now the sealing lip portion of strip embodying the invention, it is found that the behaviour of the sealing lip portion when in position in a gap to be sealed, for example a gap between a window and a frame, depends upon four main factors: the properties such as flexibility and rigidity of the sealing lip material; the lip material thickness; the width of the sealing lip, and the width of the gap.

It is found that in general satisfactory sealing results are obtained, particularly in sealing doors and windows, with a variety of different lip materials, including flexible plastics materials such as polyethylene, polyvinylchloride (PVC), polypropylene and polyesters, cellulose acetate and paper materials, particularly those impregnated with wax or plastics materials, the material thickness conveniently being in the range 0.001 in to 0.02 in (0.025 mm to 0.51 mm) and the lip width generally desirably being in the range 0.25 in to 1¼ in (6.35 mm to 31.75 mm).

Considering in more detail the behaviour of the sealing lip portion of strip in accordance with the invention applied to a sash window or other similar gap to be sealed in the bent configuration discussed above, it is found that long molecular chain lip materials, such as polyethylene and PVC, tend to transmit stresses in the material and consequently the sealing lip tends in some cases to form a gentle curve extending across the width of the lip. If the lip width is sufficiently great in relation to the gap width, the stresses can produce such a curve that the free edge of the sealing lip is raised from contact with the opposite side of the gap, this side being contacted by an intermediate region of the lip only.

In particular, experiments seem to show that with such an arrangement, if the gap width is in the range 0.032 in to 0.375 in (0.81 mm to 9.53 mm) and the thickness of polyethylene is in the range 0.005 in to 0.020 in (0.13 mm to 0.51 mm), then a lip width in the range 0.312 in to 0.75 in (7.92 mm to 19.05 mm) can form a satisfactory seal with sufficient tension in the lip to retain contact of the lip with the gap side. Further, for a gap width less than about 0.032 in (0.81 mm) and a thickness of polyethylene in the range 0.0025 to 0.007 in (0.064 mm to 0.18 mm), a lip width in the range 0.25 in to 0.312 in (6.35 mm to 7.92 mm) gives satisfactory results, providing a lip that is substantially planar.

In contrast, however, it is found that less flexible lip materials, such as short molecular chain plastics materials for example polyester, and cellulose acetate, tend not to transmit stresses in this way and consequently sealing lips of such materials do not tend to form curves. As a result, lips of such materials with a wide range of widths will tend to maintain edge contact over a wide range of gap widths with lip material thicknesses as small as 0.001 in (0.025 mm). It is, however, found that with such materials there is a tendency as the gap width approaches the thickness of the material for the whole lip to "heel" about the bend adjacent the strip attachment portion and for the lip thus to be lifted out of contact with the appropriate gap side surface. In particular, it has been found that with a lip formed of 0.0025 in (0.064 mm) thick polyester material positioned in a gap of nominal width 0.005 in (0.13 mm), a lip 0.625 in (15.88 mm) wide will lift, as above discussed, whereas a lip 0.312 in (7.92 mm) wide will remain in sealing contact. It therefore seems that for practical purposes for sealing gaps less than 0.020 in (0.51 mm) wide with such materials a reasonable optimum working tolerance is provided by use of materials with a thickness in the range 0.001 in to 0.005 in (0.025 mm to 0.13 mm) and a lip width in the range 0.25 in to 0.375 in (6.35 mm to 9.53 mm).

The behaviour and distortion of the sealing lip portion of strip applied in the bent configuration is a function of lip material displaced at the bend and is therefore a function of the lip material thickness. Thus, from both functional and economic considerations, it is preferred to use the narrowest and thinnest lip material that is practical. It has, however, been found that polyethylene and PVC with thicknesses in the range 0.002 in to 0.003 in (0.051 mm to 0.076 mm) are difficult to handle, whereas polyester type materials with thicknesses in this range are easily handles. It has further been found that cellulose acetate with thicknesses in this range functions well for sealing narrow gaps, less than about 0.03 in (0.76 mm) wide, and that for wider gaps a sealing lip of 0.005 in (0.13 mm) thick material with a lip width in the range 0.375 in to 1in (9.53 mm to 25.4 mm) is very effective, particularly for sealing doors.

A further consideration affecting the choice of lip material is the surface condition of the gap side with which sealing engagement is required. For sealing gaps with a good condition, substantially planar gap side surface, polyester material with a thickness in the range 0.002 in to 0.003 in (0.051 mm to 0.076 mm is found to give good results: such material is, as mentioned above, easy to handle, resists tearing and stress cracking and can be used in even very narrow gaps. In contrast, in cases in which the gap side surface is in poor condition, for example with an irregular surface caused, for instance, by peeling paintwork on a window frame or the like, the use of lip materials of a more flexible, more accomodating nature, such as polyethylene, is preferred. Moreover, polyethylene is very tough and is not subject to stress cracking.

Materials such as cellulose acetate and PVC are less durable than polyester and polyethylene but may nevertheless be selected for use as lip materials in cases in which ease of availability and cheapness are a consideration. Paper materials, especially those impregnated with wax or plastics, can also give satisfactory sealing results but again are not very durable and thus have a short life expectancy for use as an effective seal. Such materials are, however, suitable for use in cases in which relatively cheap, short term sealing is required.

It will thus be apparent that use of strip embodying the invention as a draught excluder for sealing doors and windows has several advantages compared with prior art draught excluder arrangements discussed above. The sealing lip portion of the strip of the invention is flexible, unlike the relatively rigid, resilient prior art strip materials discussed above, and the action of a draught flowing into a gap to be sealed provides the desired seal between the lip and gap surface by deforming the lip, rather than relying on the resilience of the strip material. As a result, the lip material of strip embodying the invention can be much thinner than prior art sealing strips and consequently can be used for sealing even very narrow gaps. A further consequence of the flexibility and possible thickness of the sealing lip portion is that the ease of opening and closing doors and windows is almost unaffected by treatment with strip embodying the invention.

According to a further aspect of the present invention, there is provided a method of preventing or reducing gas flow in an unwanted direction through an elongate gap, comprising using a sealing strip having an attachment portion secured adjacent to one side of a gap to be sealed, a flexible sealing lip portion of the strip extending into the gap and being deformed and brought into, or retained in, engagement with the opposite side of the gap, thus at least partly sealing the gap, by gas flow into the gap in an unwanted direction.

BRIEF DESCRIPTION OF THE DRAWINGS

Preferred embodiments of the invention will now be described, by way of example, with reference to the accompanying drawings, in which:

FIG. 8 is a diagrammatic sectional view, on an enlarged scale, through a portion of a sash window fitted with sealing strip in accordance with the invention, illustrating the behaviour of the sealing lip portion of the strip;

FIG. 9 is a view similar to FIG. 8, illustrating the behaviour of a sealing lip portion of different material; and FIG. 10 is an explanatory diagram, on an enlarged scale, further illustrating the behaviour of the lip material represented in FIG. 9.

DESCRIPTION OF THE PREFERRED EMBODIMENTS

Figure 1:
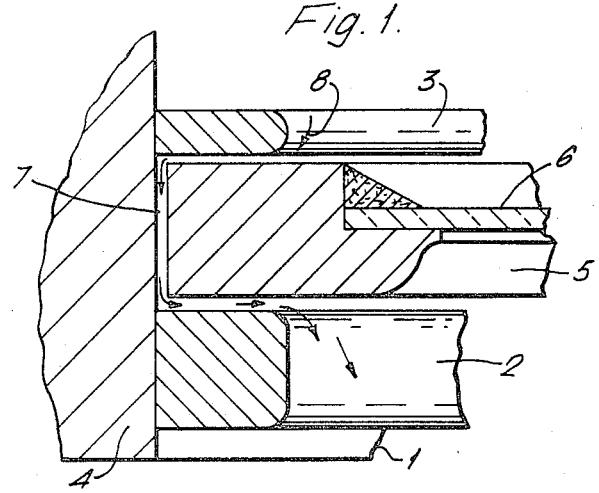
FIG. 1 is a sectional view through a portion of a sash window.

Referring to the drawings, the sash window illustrated in FIG. 1 comprises a window frame generally designated 1 consisting of inner beading 2 and outer beading 3 linked by a frame cross member 4. A sliding sash 5 provided with a pane of glass 6 is slidingly fitted between the beading, within a running channel 7 defined by the frame. As can be seen in the Figure, a clearance gap is present between the faces of the sash and frame to allow freely running opening and closing sliding movement of the sash in the frame. This gap, however, also permits passage of air draughts from the outside to the inside of the window, the draught flow path being indicated by the arrows 8.

Figure 3:
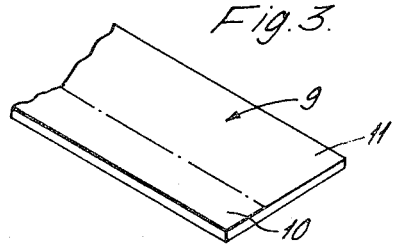
FIG. 3 is a perspective view of a portion of the sealing strip shown in FIG. 2.

In order to prevent such draught flow, the window has fitted thereto sealing strip in accordance with the invention, an embodiment of such strip being illustrated in FIG. 3.

Referring to FIG. 3, the illustrated strip 9 comprises a strip of flexible plastics material, for example commercially available polyethylene sheet as sold for covering haystacks, provided with a continuous stripe of suitable adhesive 10 running along the length of one side of the strip adjacent to one edge thereof. A portion of the strip adjacent to the opposing edge thereof is left uncovered, and forms a sealing lip portion 11.

Figure 3A:
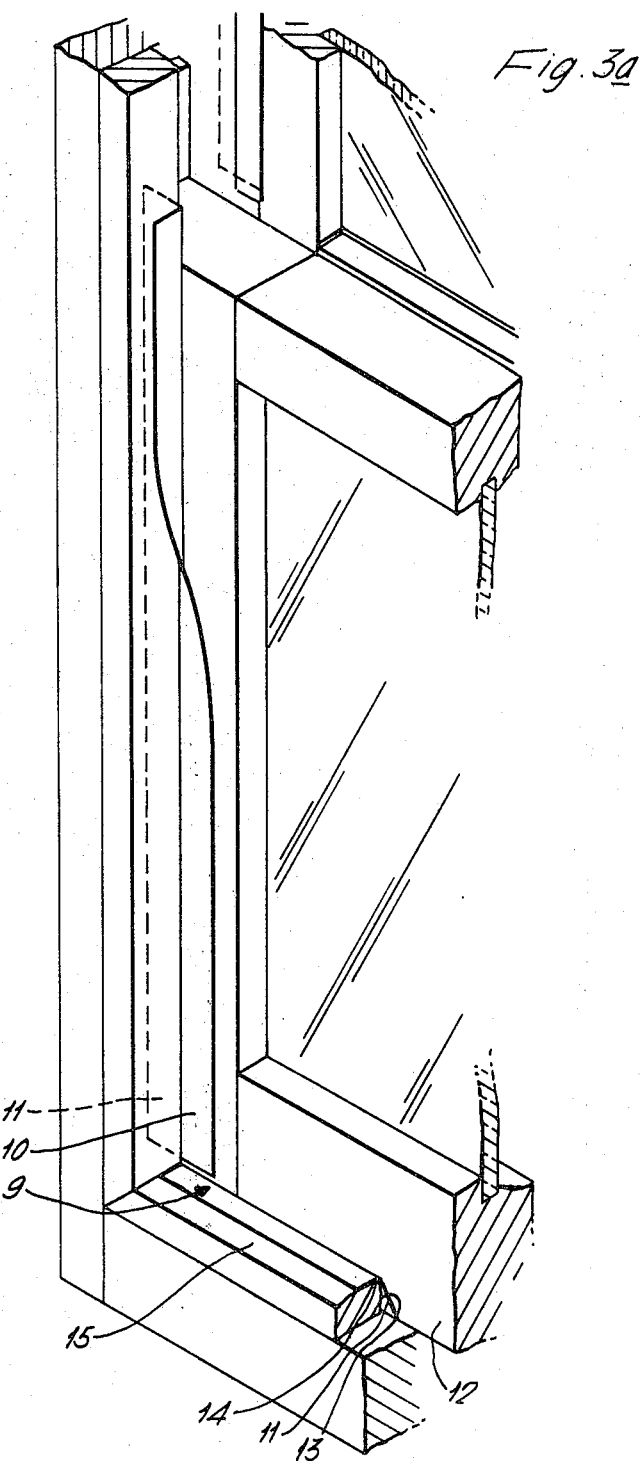
FIG. 3a is a perspective view of a portion of a sash window illustrating fitment thereto of sealing strip in accordance with the invention.

Suitable lengths of the strip 9 are conveniently fitted around the sides of the sash window in the manner illustrated in FIG. 3a. The sealing lip portion 11 of the strip is slid into a gap between the sash inner face 12 and the outer face 13 of the inner beading 2, the strip being bent around the adjacent beading edge 14 and the adhesive stripe 10 secured to the adjacent horizontal or vertical face 15 of the inner beading 2.

Figure 2:
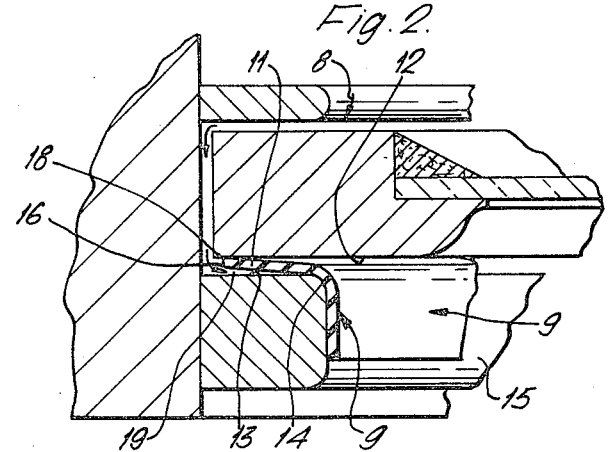
FIG. 2 is a view similar to FIG. 1, showing the window fitted with sealing strip in accordance with the invention.

The configuration adopted by a strip 9 applied in such a manner is illustrated in FIG. 2. As illustrated in that Figure, restoring stresses in the lip material cause the outer, free edge 16 of the lip portion 11 to tend to be raised from the outer face 13 of the inner beading 2 and biased towards and brought into contact with the sash inner face 12 in region 18. Draughts flowing from outside along the path represented by arrows 8 will thus flow into the space 19 between the strip sealing lip portion 11 and the beading outer face 13 and draught pressure in this space 19 will tend to force the free edge 16 of the lip portion 11 into sealing engagement with the region 18 of the sash inner face 12, the lip portion 11 thus sealing the gap between the sash and the frame.

Figure 4:
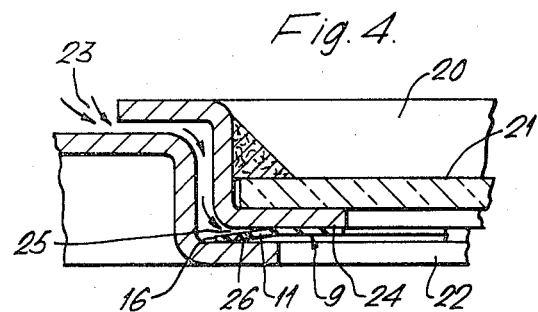
FIG. 4 is a sectional view through a portion of a casement window fitted with sealing strip in accordance with the invention.

Referring now to FIG. 4, there is shown one preferred method of treating a casement window with sealing strip in accordance with the invention. The illustrated casement window comprises a casement 20 provided with a pane of glass 21 and hingedly mounted in conventional manner in a frame 22, the casement being arranged to open outwardly. A gap is shown extending between the casement 20 and frame 22, allowing the flow of air draughts from outside through the gap along the path represented by arrows 23.

In order to prevent such draught flow from reaching the inside of the window, a length of sealing strip 9 in accordance with the invention is secured to the inner face 24 of the casement, with the sealing lip portion 11 of the strip 9 extending outwardly into the gap and being positioned upstream, with respect to the draught flow, of the attachment portion of the strip. The strip 9 is so positioned that the sealing lip portion 11 extends slightly beyond the planar casement face 24 to which the strip is secured and the outer region of the lip portion 11 adjacent to the free edge 16 thereof thus extends into the draught flow path. As a result, draughts will tend to flow into space 25 between lip portion 11 and casement inner face 24, tending to lift the sealing lip 11 from the casement inner face 24 and urge the free edge 16 of the lip portion 11 into engagement with the opposing outwardly facing surface 26 of the frame to form a seal therewith.

As discussed above, to assist such lifting action it is preferred when treating windows or doors in this manner to use strip having such a construction that when the strip is secured to a planar surface there is a tendency for the free edge of the sealing lip portion to be raised from the surface, with the sealing lip portion inclined with respect to the surface.

Figure 5:
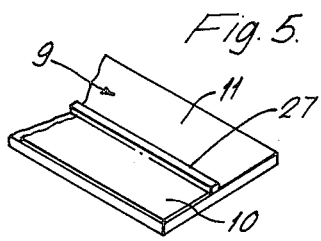
FIGS. 5, 6 and 7 are perspective views of portions of sealing strips in accordance with the invention.
Figure 6:
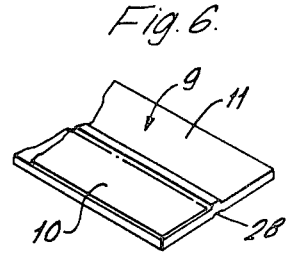
Figure 7:
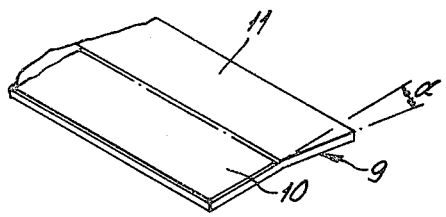

Three examples of strips embodying the invention and having such a construction are illustrated in FIGS. 5, 6 and 7.

Referring to FIG. 5, the illustrated strip 9 is of similar construction to the strip described and illustrated with reference to FIG. 3 and includes an adhesive stripe 10 and a sealing lip portion 11. The strip 9 is further provided with a narrow raised strip 27, moulded or affixed thereto, running along the length thereof between the adhesive stripe 10 and the sealing lip portion 11. When such a strip is secured by means of the adhesive stripe to a flat surface, the lip portion 11 will tend to pivot about the line of strip 27 and thus be inclined with respect to the surface.

A further embodiment of strip 9 of similar construction is illustrated in FIG. 6, this strip having running along its length a deformation ridge 28 that functions in a similar manner to raised strip 27.

With reference now to FIG. 7, the illustrated strip 9 is again of similar construction, but in addition is so constructed or so deformed, e.g. by folding action, that the sealing lip portion 11 tends to lie in a plane that is inclined at a desired angle α to the plane of the adhesive stripe 10. The lip portion 11 is, however, capable of being flattened and brought substantially into alignment with the plane of the adhesive stripe 10 to permit closure of a door or window to which the strip is applied. Depending upon factors such as the properties of the material from which such a strip is constructed and the proposed use, such a strip is conveniently provided with an inclination angle α of up to about 30°.

Considering now FIGS. 8, 9 and 10, these Figures illustrate the behaviours of the sealing lip portion of strip in accordance with the invention when fitted to a sash window in the manner described and illustrated with reference to FIGS. 2, 3 and 3a, and illustrate the effect of lip width, the width of the gap between the sash inner face and the inner beading outer face, and the lip material on such behaviour.

These Figures each show a sealing strip 9 secured by means of an adhesive stripe 10 thereof of width C to a horizontal or vertical face 15 of frame inner beading, the sealing lip 11 of the strip extending into the gap between the beading outer face 13 and the sash inner face 12. FIGS. 8 and 9 each show two possible positions of the sash inner face, one position in which a narrow gap of width D is defined between the sash and frame and into which extends a relatively narrow lip 11 of width approximately equal to B and of thickness F, and another position in which a relatively wide gap of width E is defined between the sash and frame and into which extends a much wider lip of width approximately equal to A and of the same thickness F.

FIG. 8 illustrates the behaviour of a sealing lip 11 made of polyethylene, a very flexible "soft" material, and illustrates the tendency for a lip made of such material to assume a curved configuration, as discussed above. As shown in the Figure, the narrow lip disposed in the narrow gap adopts a substantially planar configuration with the free edge 16 of the lip contacting the sash inner face 12 and suitable disposed to form a seal therewith under the influence of draught flow entering the gap from outside. However, the wide lip disposed in the wide gap adopts a curved configuration because of the transmission of stresses through the material, as discussed above, resulting in contact between the sash inner face 12 and lip occurring only in an intermediate region 29 approximately half way across the lip width, the free edge 16 of the lip being raised from contact with the sash inner face 12. Such a lip configuration permits air draught flowing from outside the windows to enter the space 30 between the lip and sash inner face 12, such draughts thus tending to raise the lip from the face 12, rather than sealing the lip in engagement therewith, and permits draught flow to the inside of the window.

In contrast, FIGS. 9 and 10 illustrate the behaviour of a sealing lip 11 made of polyester type material, a less flexible, "harder" material. As shown in FIG. 9, both the narrow lip disposed in the narrow gap and the wide lip disposed in the narrow gap and the wide lip disposed in the wide gap adopt a substantially planar configuration with the free edge 16 of the lip contacting the sash inner face 12 and suitably positioned to be urged into sealing contact therewith under the influence of draught flow entering the gap from outside.

However, as shown in FIG. 10, when a lip of such material is disposed in a gap of width D approximately equal to 2F, the lip tends, as discussed above, to "heel" over in region 31 adjacent to the beading edge 14, with the outer portion of the lip 11 extending back towards the beading outer face 13. As a result, the lip 11 is lifted completely out of contact with the sash inner face 12, thus preventing the formation of a seal between the lip 11 and face 12 and hence permitting draughts to flow from the outside to the inside of the window. In the interest of clarity, the gap width D and lip thickness F are represented in this Figure on a considerably larger scale than is the lip width B.

Various suitable combinations of gap width, lip width and lip material thickness for various lip materials have been specified above.

I claim:

1. A door and window sealing weather strip for sealing an elongated gap between a door or window and its associated frame, said strip having no perforated tear line or crease along its length, comprising
   (a) an attachement portion comprising an adhesive material extending along the length of the strip for securing the strip in position to a member located on one side of said gap to be sealed; and
   (b) a flexible sealing lip portion extending along the length of said strip and capable of being deformed to be brought into, and retained in, sealing configuration in the gap in response to air flow in an unwanted direction into said gap, said lip portion having a width sufficient to extend across said gap and a thickness less than the width of said gap so as to prevent interference thereof with the opening or closing of the door or window and so that the sealing action of said lip portion is effected solely by the action of the air flowing in an unwanted direction, urging said lip portion into and across the gap and into sealing engagement with a member located on the opposite side of the gap.

2. The strip of claim 1 in which a surface of the attachment portion is provided with an adhesive material forming one or more adhesive regions.

3. The strip of claim 2 in which the adhesive is a rubber based adhesive.

4. The strip of claim 2 in which the adhesive is an ultra violet resistant synthetic adhesive.

5. The strip of claim 2, 3 or 4 in which a removable cover is provided over the adhesive region or regions.

6. The strip of claim 5 in which the cover is longitudinally divided into a wide, outer, edge portion and a narrow, inner, central portion that are separately removable.

7. The strip of claim 2 in which the adhesive region is in the form of an adhesive stripe extending inwardly from one edge of the strip in a continuous line along the length of the strip.

8. The strip of claim 7 in which the adhesive stripe has a width in the range 0.25 in to 1 in (6.35 mm to 25.4 mm).

9. The strip of claim 7 or 8, formed from a strip of adhesive tape having adhered to an adhesive surface thereof a strip of lip material arranged to form, at least in part, the sealing lip portion of the strip, a stripe of adhesive of desired width being left uncovered on one side of the tape and any remaining uncovered adhesive regions being masked with suitable masking material.

10. The strip of claim 9 in which the adhesive tape is adhesive on one side only, said strip of lip material being adhered along the length of the tape, extending inwardly from one edge of the tape, said strip of lip material being of such width as to leave uncovered an adhesive stripe of desired width extending inwardly from the opposing edge of the tape.

11. The strip of claim 10 in which said strip of lip material also extends outwardly from said one edge of the tape.

12. The strip of claim 1 in which the sealing lip portion is formed of flexible plastics material.

13. The strip of claim 12 in which the plastics material comprises polyethylene, PVC, polypropylene or a polyester.

14. The strip of claim 1 in which the sealing lip portion is formed of cellulose acetate.

15. The strip of claim 1 in which the sealing lip portion is formed of a paper material.

16. The strip of claim 15 in which the paper material is impregnated with wax or a plastics material.

17. The strip of claim 1 in which the sealing lip portion has a width in the range 0.25 in to $1\frac{1}{4}$ ins. (6.35 mm to 31.75 mm).

18. The strip of claim 1 in which the sealing lip portion is formed of material having a thickness in the range 0.001 in to 0.02 in (0.025 mm to 0.51 mm).

19. The strip of claim 1 in which the strip is so constructed that when the strip is secured, by means of the attachment portion thereof, to a flat surface, the sealing lip portion is raised from the surface and is inclined with respect to the attachment portion and the surface.

20. The strip of claim 19 in which the sealing lip portion tends to lie in a plane that is inclined at a desired angle to the plane of the attachment portion, the strip being capable of being flattened to bring said portions into substantially co-planer relationship.

21. A door and window sealing weather strip formed from a strip of adhesive tape for sealing an elongated gap between a door or window and its associated frame, comprising (a) an attachment portion having an adhesive stripe on both sides extending inwardly from one edge of the strip in a continuous line along the length of the strip for securing the strip in position to a member located on one side of the gap to be sealed; and (b) a strip of lip material arranged to form, at least in part, a flexible sealing lip portion extending along the length of said strip and capable of being deformed to be brought into, and retained in, sealing configuration in the gap in response to air flow in an unwanted direction in said gap, the strip of lip material being adhered to one side of the tape and extending inwardly from one edge thereof, and the strip of lip material being of such width as to leave uncovered an adhesive stripe of desired width on said one side of the tape extending inwardly from the opposing edge of the tape, the opposing side of the tape being masked with suitable masking material, said lip portion having a width sufficient to extend across said gap and a thickness less than the width of said gap so as to prevent interference thereof with the opening or closing of the door or window and so that the sealing action of said lip portion is effected solely by the action of the air flowing in the unwanted direction, urging said lip portion into and across the gap and into sealing engagement with a member located on the opposite side of the gap.

22. The strip of claim 21 in which the strip of lip material also extends outwardly from said one edge of the tape.

23. A door and window sealing weather strip formed from a strip of adhesive tape for sealing an elongated gap between a door or window and its associated frame, comprising (a) an attachment portion having an adhesive stripe on both sides extending inwardly from one edge of the strip in a continuous line along the length of the strip for securing the strip in position to a member located on one side of the gap to be sealed; and (b) a strip of lip material arranged to form, at least in part, a flexible sealing lip portion extending along the length of said strip and capable of being deformed to be brought into, and retained in, sealing configuration in the gap in response to air flow in an unwanted direction in said gap, the adhesive tape having one side covered, at least in part, with the strip of lip material that extends outwardly from one edge of the tape, an adhesive stripe of desired width being left uncovered on one side of the tape and masking material being provided to cover any uncovered adhesive on said one side of the tape, said lip portion having a width sufficient to extend across said gap and a thickness less than the width of said gap so as to prevent interference thereof with the opening or closing of the door or window and so that the sealing action of said lip portion is effected solely by the action of the air flowing in the unwanted direction, urging said lip portion into and across the gap and into sealing engagement with a member located on the opposite side of the gap.

24. A door and window sealing weather strip having no crease along its length formed from a strip of adhesive tape having a width in the range of $\frac{1}{4}''$ to $1\frac{1}{4}''$ (6.35 mm to 31.75 mm) for sealing an elongated gap between a door or window and its associated frame, comprising (a) an attachment portion having an adhesive stripe on a surface of the attachment portion extending inwardly from one edge of the strip in a continuous line along the length of the strip and provided with an adhesive material forming one or more adhesive regions for securing the strip in position to a member located on one side of the gap to be sealed; and (b) a strip of lip material arranged to form, at least in part, a flexible sealing lip portion extending along the length of the strip and capable of being deformed to be brought into, and retained in, sealing configuration in the gap in response to air flow in an unwanted direction in said gap, the strip of lip material being adhered to the adhesive region or regions and extending inwardly from one edge, a stripe of adhesive of desired width being left uncovered on one side of the tape and any remaining uncovered adhesive region or regions being masked with suitable masking material, said lip portion having a width sufficient to extend across said gap and a thickness less than the width of said gap so as to prevent interference thereof with the opening or closing of the door or window and so that the sealing action of said lip portion is effected solely by the action of the air flowing in the unwanted direction, urging said lip portion into and across the gap and into sealing engagement with a member located on the opposite side of the gap.

25. The strip of claim 21 or 23 or 24, in which the adhesive stripe has a width in the range of 0.25" to 1" (6.35 mm to 25.4 mm).

26. A door and window sealing weather strip having no crease along its length for sealing an elongated gap between a door or window and its associated frame, comprising (a) an attachment portion comprising an adhesive material extending along the length of the strip for securing the strip in position to a member located on one side of said gap to be sealed; and (b) a flexible sealing lip portion formed of polyethylene or PVC and extending along the length of said strip and capable of being deformed to be brought into, and retained in, sealing configuration in the gap in response to air flow in an unwanted direction into said gap, said lip portion having a width in the range of 0.312" to 0.75" (7.92 mm to 19.05 mm) and a thickness in the range of 0.005" to 0.02" (0.13 mm to 0.51 mm) so as to prevent interferences thereof with the opening or closing of the door or window and so that the sealing action of said lip portion is effected solely by the action of the air flowing in an unwanted direction, urging said lip portion into and across the gap and into sealing engagement with a member located on the opposite side of the gap.

27. A door and window sealing weather strip having no crease along its length for sealing an elongated gap between a door or window and its associated frame, comprising (a) an attachment portion comprising an adhesive material extending along the length of the strip for securing the strip in position to a member located on one side of said gap to be sealed; and (b) a flexible sealing lip portion formed of polyethylene or PVC and extending along the length of said strip and capable of being deformed to be brought into, and retained in, sealing configuration in the gap in response to air flow in an unwanted direction into said gap, said lip portion having a width in the range of 0.25" to 0.312" (6.35 mm to 7.92 mm) and a thickness in the range of 0.0025" to 0.007" (0.064 mm to 0.18 mm) so as to prevent interference thereof with the opening or closing of the door or window and so that the sealing action of said lip portion is effected solely by the action of the air flowing in an unwanted direction, urging said lip portion into and across the gap and into sealing engagement with a member located on the opposite side of the gap.

28. A door and window sealing weather strip having no crease along its length for sealing an elongated gap between a door or window and its associated frame, comprising (a) an attachment portion comprising an adhesive material extending along the length of the strip for securing the strip in position to a member located on one side of said gap to be sealed; and (b) a flexible sealing lip portion formed of polyester or cellulose acetate and extending along the length of said strip and capable of being deformed to be brought into, and retained in, sealing configuration in the gap in response to air flow in an unwanted direction into said gap, said lip portion having a width in the range of 0.25" to 0.375" (6.35 mm to 9.53 mm) and a thickness in the range of 0.001" to 0.005" (0.025 mm to 0.13 mm) so as to prevent interference thereof with the opening or closing of the door or window and so that the sealing action of said lip portion is effected solely by the action of the air flowing in an unwanted direction, urging said lip portion into and across the gap and into sealing engagement with a member located on the opposite side of the gap.

29. A door and window sealing weather strip having no crease along its length for sealing an elongated gap between a door or window and its associated frame, comprising (a) an attachment portion comprising an adhesive material extending along the length of the strip for securing the strip in position to a member located on one side of said gap to be sealed; and (b) a flexible sealing lip portion formed of cellulose acetate and extending along the length of said strip and capable of being deformed to be brought into, and retained in, sealing configuration in the gap in response to air flow in an unwanted direction into said gap, said lip portion having a width in the range of 0.375" to 1" (9.53 mm to 25.4 mm) and a thickness of about 0.005" (0.13 mm) so as to prevent interference thereof with the opening or closing of the door or window and so that the sealing action of said lip portion is effected solely by the action of the air flowing in an unwanted direction, urging said lip portion into and across the gap and into sealing engagement with a member located on the opposite side of the gap.

30. A door and window sealing weather strip for sealing an elongated gap between a door or window and its associated frame, comprising (a) an attachment portion comprising an adhesive material extending along the length of the strip for securing the strip in position to a member located on one side of said gap to be sealed;

(b) a flexible sealing lip portion extending along the length of said strip and capable of being deformed to be brought into, and retained in, sealing configuration in the gap in response to air flow in an unwanted direction into said gap, said lip portion having a width sufficient to extend across said gap and a thickness less than the width of said gap so as to prevent interference thereof with the opening or closing of the door or window and so that the sealing action of said lip portion is effected solely by the action of the air flowing in an unwanted direction, urging said lip portion into and across the gap and into sealing engagement with a member located on the opposite side of the gap; and (c) a raised strip or deformation ridge running along the length of the strip between the attachment portion and the sealing lip portion, the strip being so constructed that, when the strip is secured, by means of the attachment portion, to a flat surface of the member, the sealing lip portion is raised from the surface and is inclined with respect to the attachment portion and the surface.

31. A method of weather stripping door or windows and their associated frame so as to seal an elongated gap therebetween with a weather strip having no crease along its length and which comprises an attachment portion comprising an adhesive material extending along the length of the strip and a flexible sealing portion extending along the length of said strip and capable of being deformed to be brought into, and retained in, sealing configuration of said gap, comprising the steps of:

securing the attachment portion of said weather strip to a member along one side of said gap to be sealed so that said sealing portion extends into said gap, and providing said lip portion with a width sufficient to extend across said gap and a thickness less than the width of said gap so as to prevent interference thereof with the opening or closing of the door or window and so that the sealing action of said lip portion is effected soley by the action of the air flowing in an unwanted direction, urging said lip portion into and across the gap and into sealing engagement with a member located on the opposite side of the gap.

32. The method of claim 31 in which the strip is secured in position adjacent to one side of a gap between a sash window, a casement window or a door and its frame, the attachment portion being secured to an appropriate surface of the window, door or frame, the strip being so positioned that the sealing lip portion is disposed upstream of the attachment portion in the gap, the attachment and sealing lip portions being disposed in substantially the same plane or being slightly inclined with respect to one another.

33. A method of weather stripping door or windows and their associated frames so as to seal an elongated gap therebetween with a weather strip comprising an attachment portion comprising an adhesive material extending along the length of the strip and a flexible sealing portion extending along the length of said strip and capable of being deformed to be brought into, and retained in, sealing configuration of said gap, comprising the steps of:

securing the strip in position adjacent to one side of a gap between a sash window and its frame, the attachment portion of the strip being secure to a horizontal or vertical face of the frame inner beading along one side of said gap to be sealed so that said sealing portion extends into said gap, the strip is bent around the adjacent beading edge and the sealing lip portion of the strips is disposed in the gap between the adjacent outer face of the inner beading and the opposing portion of the inner face of the sash, and providing said lip portion with a width sufficient to extend across said gap and a thickness less than the width of said gap so as to prevent interference thereof with the opening or closing of the door or window and so that the sealing action of said lip portion is effected solely by the action of the air flowing in an unwanted direction, urging said lip portion into and across the gap and into sealing engagement with a member located on the opposite side of the gap.

* * * * *